Figure 15:
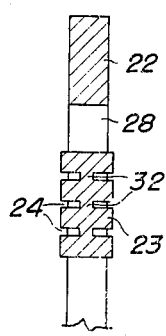

Aug. 17, 1965   YOSHIO TSUNODA ETAL   3,201,339
ELECTRODIALYZER
Filed March 15, 1961
3 Sheets-Sheet 1
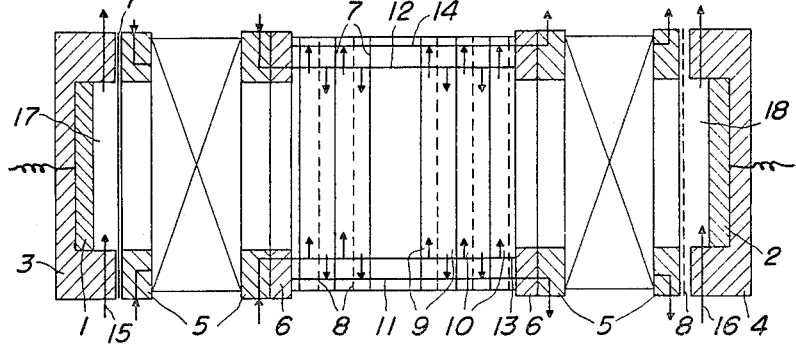
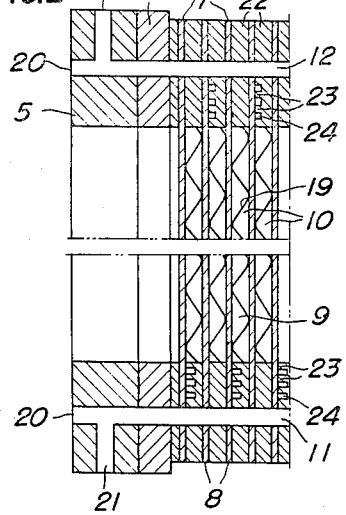
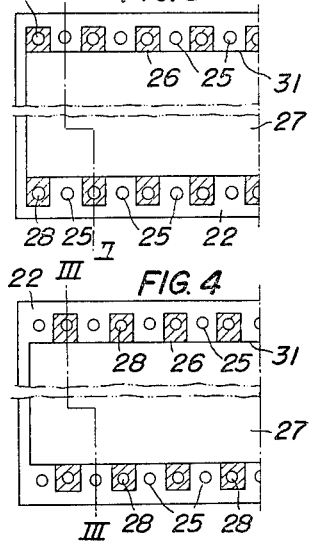
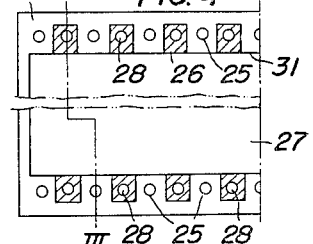
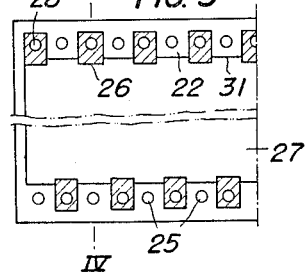
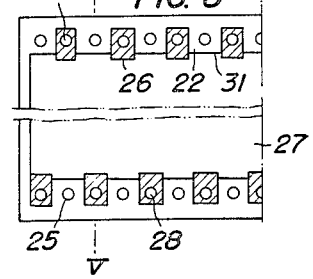
INVENTORS
YOSHIO TSUNODA, MAOMI SEKO, MASAAKI KATO
TERUYUKI MISUMI, MASASI MITUISI and YUTAKA TOYODA
BY
ATTORNEYS

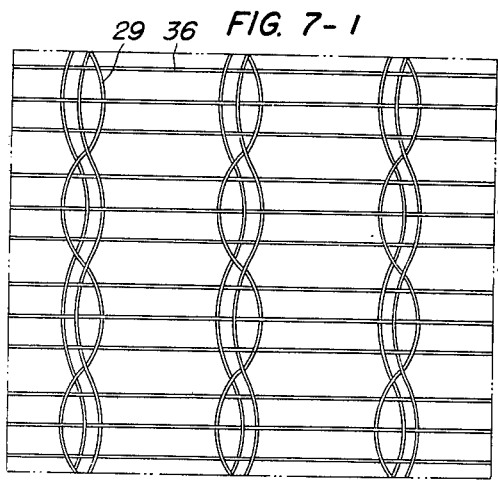
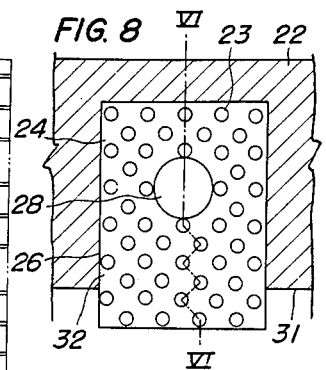
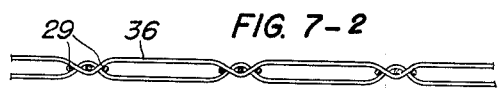
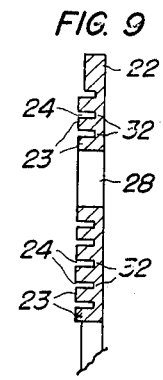
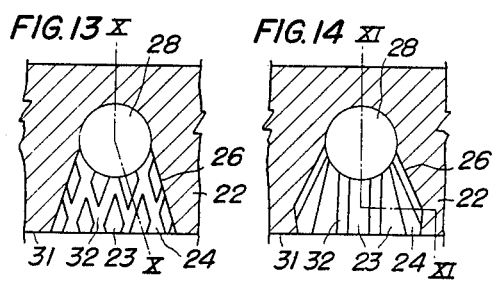
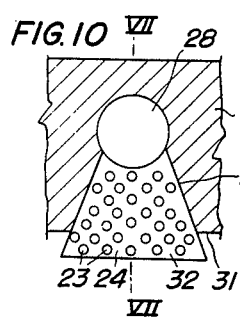
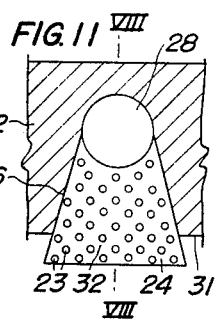
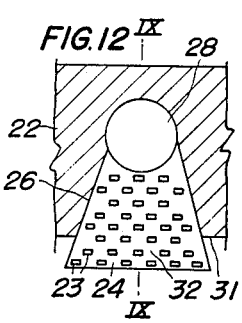

Aug. 17, 1965  YOSHIO TSUNODA ETAL  3,201,339
ELECTRODIALYZER
Filed March 15, 1961  3 Sheets-Sheet 3

INVENTORS
YOSHIO TSUNODA, MAOMI SEKO, MASAAKI KATO, TERUYUKI MISUMI,
MASASI MITUISI and YUTAKA TOYODA
BY
Nenteroth, Lind & Ponack
ATTORNEYS United States Patent Office 3,201,339
Patented Aug. 17, 1965

3,201,339
ELECTRODIALYZER
Yoshio Tsunoda and Maomi Seko, Tokyo, and Masaaki Kato, Teruyuki Misumi, Masasi Mituisi, and Yutaka Toyoda, Nobeoka-shi, Japan, assignors to Ashi Kasei Kogyo Kabushiki Kaisha, Osaka, Japan, a corporation of Japan
Filed Mar. 15, 1961, Ser. No. 96,035
Claims priority, application Japan, Mar. 23, 1960, 35/9,023
10 Claims. (Cl. 204—301)

The present invention relates to a multi-cell electrodialyzer which comprises a plurality of selectively anionpermeable resin membranes and selectively cation-permeable resin membranes. More particularly this invention deals with the manner in which membranes and gaskets are assembled so that the holes provided in the peripheral part of membranes and gaskets are aligned and form conduits for supplying or discharging the solution to the alternative diluting and concentrating compartments.

More particularly this invention relates to a method of providing passageways for the solution between said conduits and alternate diluting and concentrating compartments, by the presence of compressible projections.

It is the principal object of the present invention to provide a multi-cell electrodialyzer comprising gaskets, spacers and selectively ion-permeable membranes which are easily handled, which are leakproof, which have a small intermembrane distance, and which are capable of keeping the solution uniform in the cell and preventing polarization on the membrane surface and scale formation.

Further it is another object of the present invention to provide a gasket having passageways which can supply or discharge a large quantity of solution with small flow resistance.

In an attempt to desalt or concentrate an electrolytic solution or to separate more than two materials, an electrodialysis apparatus having alternately placed selectively anionpermeable resin membranes and selectively cation-permeable resin membranes so as to have concentrating compartments and diluting compartments in alternate alignment has been used heretofore. In general, however, the previously known apparatus requires high skill and considerable time to assemble or disassemble a stack because of the complexity of its construction. For instance, in the apparatus of U.S. Pat. No. 2,758,083, a stack is constructed by assembling ion exchange resin membranes having holes to form the conduit for the solution, square-shaped elastic gaskets holding the rim part of the membranes around the holes, spacing members, and pressing members such as mica plate etc. located around the hole in order to prevent the leakage of the solution. In such an apparatus, too many parts are necessary for the construction of stack. In the apparatus of U.S. Pat. No. 2,758,083 considerable effort and skill would be required for assembling or disassembling the apparatus, because there are so many parts necessary to enable the gaskets to define a passageway for a solution. As to the reason why such method should be employed, in U.S. Pat. No. 2,758,083, it is mentioned in the specification that a sufficiently small distance between membranes can not be maintained by utilizing only gaskets having holes therein from a conduit for the solution.

According to the present invention, however, the holes for forming the conduit are provided in both the gaskets and membranes at corresponding positions, and when the gaskets and membranes are alternately assembled, the holes in the membranes and gaskets at corresponding positions are aligned and form a conduit for a solution, and the solution is supplied through flow paths to each of the alternate cells from the solution passageway, which flow paths are provided between the conduits and the dialysis area in each of the alternate frames and which have flow path portions which have specific projections therein.

In the present invention, a stack can be built up merely by stacking alternately the frames and membranes and the spacers. This construction eliminates complicated operations which are necessary to form the conduits in the U.S. Pat. No. 2,758,083, and it requires no special skill and only a short time for assembling and disassembling.

Figure 16:
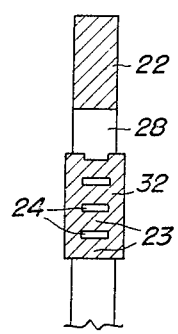
Figure 17:
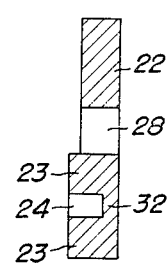
Figure 18:
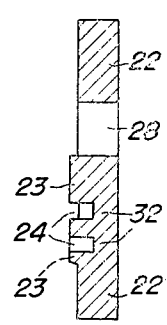
Figure 19:
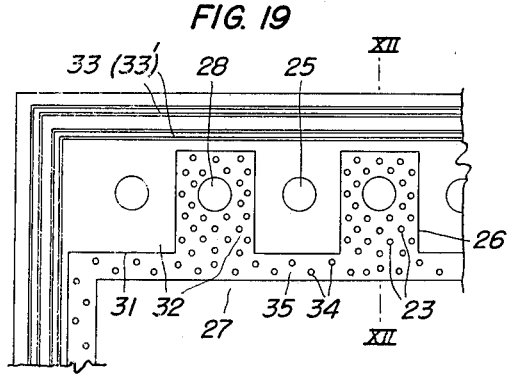
Figure 20:
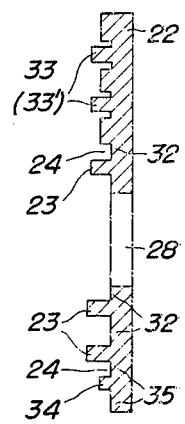

In the accompanying drawings, FIGURE 1 is a schematic sectional view showing the flows of solutions in the dialyser according to the present invention; FIGURE 2 is a sectional view of a part of a stack which comprises a number of concentrating cells and diluting cells, each of which is defined between a pair of selectively ion-permeable resin membranes and gasket and which contains a spacer, and corresponds to the sections taken along the line II—II of FIGURE 3, line III—III of FIGURE 4, IV—IV of FIGURE 5 or V—V of FIGURE 6. FIGURES 3, 4, 5 and 6 are respectively plan views of the gasket body. FIGURES 7-1 and 7-2 are enlarged plan and side views of a spacer. FIGURE 8 is a plan view of a flow path portion having compressible projections thereon and positioned in the solution passageway. FIGURE 9 is a sectional view taken on line VI—VI of FIG. 8. FIGURES 10, 11, 12, 13, 14 are plan view of modifications of the flow path portions. FIGURES 15 and 16 are sections taken along the line VII—VII in FIGURE 10, VIII—VIII in FIGURE 11, IX—IX in FIGURE 12. FIGURE 17 is a section taken along the line X—X in FIGURE 13. FIGURE 18 is a section taken along the line XI—XI in FIGURE 14. FIGURE 19 is a plan view of a part of a frame, and FIGURE 20 is a section taken along the line XII—XII in FIGURE 19.

The present invention is illustrated in detail with reference to the accompanying drawings. In FIGURE 1, 17 is a cathodic cell and is composed of a cathode 1, a cathode box 3 made of or lined with insulating materials and a selectively ion-permeable resin membrane 7, for example a cation-permeable resin membrane located in front of the box 3. 18 is an anodic cell which comprises an anode 2, an anode box 4 made of or lined with insulating materials and a selectively ion-permeable resin membrane, for example a selectively anion-permeable membrane 8. The frames 5 are solution feeding frames located between the cathodic and anodic cells. There is at least one stack jointly combined by two fastening frames 6 between each pair of feeding frames 5. A frame which serves for both solution feeding and fastening may be used. Arrows 15 and 16 show the flows of solution in the cathodic and anodic cells to rinse out substances produced by electrode reaction during dialysis such as sodium hydroxide chlorine and the like. The stack shown in the middle part of FIGURE 1 is composed of a plurality of diluting cells 9 and concentrating cells 10 partitioned by selectively cation-permeable membranes 7 and selectively anion-permeable resin membranes 8. One or plurality of conduits 11 connect the diluting cells 9, and a diluting solution is fed to the diluting cells 9, through the conduit 11 from, normally, the bottom of dialysis apparatus and discharged through one or plurality of conduits 14 which connect the diluting cells 9 at the upper part of the dialysis apparatus. Similarly, a concentrating solution is fed into each concentrating cell 10 through one or plurality of conduits 12 which connect the concentrating cells 10 at, normally, the upper part of the dialyzer, and then is discharged through one or plurality of conduits 13 which connect each concentrating cell 10 at the bottom of the dialyzer. The present invention can of course be applied when the direction of flow of the solution and/or order of placement of concentrating and diluting cells is the reverse of that shown in FIGURE 1.

FIGURES 3, 4, 5, 6 are front views of spacer frames for holding the borders of selectively ion-permeable membranes 7 and 8 and said spacer frames have in both the upper and bottom sides a plurality of more than four holes 25 and 28 which when they are aligned contsitute inlet and outlet ducts 11, 12, 13, 14 of concentrating and diluting solutions. Frames shown respectively in FIGURES 3, 4, 5, 6 are referred to as "A-frame," "B-frame," "C-frame," and "D-frame" hereinafter in the present specification. Frames A and B (or frames C and D) have the same number of holes (25 and 28) the holes 25 in frame A being aligned with the holes 28 in frame B when the frames are against each other, and holes 28 in frame A being aligned with holes 25 in frame B at the same time. The holes in frames C and D are similarly aligned.

Holes 28 in FIGURES 4, 5, 6 are in solution path portions 26 in the frames, while holes 25 are in the frame body. The diameter of holes 25 is greater than that of holes 28 for a reason to be mentioned hereinafter. Selectively ion-premeable resin membranes 7 and 8 have holes therein the same in number and at positions corresponding to the holes in frames A and B or C and D, and the diameter of the holes in the membranes may be same or different from that of the holes in the frames. The more holes, the better for maintaining flow uniformly within each of the cells. It is preferable that these holes be provided at intervals of less than 30 cm.

FIGURE 7 shows a part of a spacer 19 as shown in FIG. 1 woven with hard, waterproof filaments 29 and 36 resistant to chemicals and made of vinylidene chloride copolymer, polyvinyl chloride and other organic or inorganic high molecular weight substances. These spacers are placed between a plurality of selectively anion-permeable resin membranes 8, and selectively cation-permeable resin membranes 7, just within available electro-dialysis area 27 so as to inhibit contact of adjacent membranes so that the distance between membranes is kept constant and the same everywhere within the diluting cells 9 and the concentrating cells 10. The solution in the cell flows through the space 30 of the spacer and effective turbulent flows are produced on the membrane surface, but nevertheless the electroconductive area is not reduced. FIGURE 7 shows the woven nature of the spacer, 7–1 being a plan view and 7–2 being a sectional view. As will readily be seen in FIGURE 7, each warp is twisted and entangled, and is woven upwards and downwards about wefts 36, whereby the spacer is given thickness.

When the frames A, the frames B, selectively cation-permeable membranes 7, selectively anion-permeable 8, and spacers 17 are assembled in the sequence, taken in the direction from anode to cathode, membrane 7, frame A with spacer 19 within it, membrane 8, and frame B with spacer 19 within it, the ducts 11, 12, 13, 14 for solutions are constituted by the aligned holes 25 and 28.

As shown in FIGURES 8 to 18 solutions paths 24 are provided in the solution path portions of the frame between the holes 28 and the inner edge 31 of the frame. In the solution paths there exist compressible projections 23 the dimension of which in the direction of the thickness of the frames is not smaller than, or is reducible by compression to, the thickness of the frame body. The solution flows through the spaces between the projections. FIGURE 8 shows a typical example of the solution path portion 26 with projections 23, where projections are on a thin sheet 32 of the same material as the frame. The solution path portion 26 may be of the same material as the frame and be integral with the frame body 22, or may be of a material different from the frame body and made as a separate insert to be joined to the frame body 22 by adhesive or welding. The projections 23 may be of arbitrary dimensions and shapes such as cylinder, prism, sphere. The cylindrical one is most easy to prepare. When the least distance between the projection is smaller than the equivalent diameter of the projections, and there are no straight unobstructed paths between the hole 28 and the inside of the frame, but only broken paths, the bending of membranes towards the space between projections is prevented and the leaking of the solution is checked. FIGURE 2 is a section taken along the line II—II in FIGURE 3 and III—III in FIGURE 4 (or IV—IV in FIGURE 5 and V—V in FIGURE 6) and the detail of the construction of the stack is shown. 6 is a mechanically strong frame called a fastening frame and it has in it the same number of holes at the positions corresponding to the holes forming the ducts in the membranes and frames. Between two fastening frames 6, a plurality of selectively cation-permeable resin membranes 7, selectively anion-permeable resin membranes 8, frames A (or C), frames B (or D) and spacers 19 are placed in the sequence mentioned above, and they are pressed together by the two fastening frames 6 and the thus prepared stack is placed and pressed between two feeding frames 5 (in FIGURE 2 only one feeding frame is shown). The pressure applied to a stack is adjusted according to the properties of the frame body 22 and projections 23. When the pressure is applied, the projections having a dimension greater than the thickness of the frame body 22 are compressed so that the height of projections is equal to the thickness of the frame body, while each hole in a membrane is placed between two holes in the frames on opposite sides of the membrane, one being the hole 25 in the frame body, the other being the hole 28 in the solution path portion with projections 23, and the area of membrane around the hole is in tight contact with the area of the frame around the hole 25 so as to prevent mixing of the two solutions, while the other side of the membrane around the hole contacts the tops of projections 23 and the solution flows freely through the space 24 among the projections 23. In the feeding frame 6 the same number of holes 20 are formed as in the fastening frames 6, membranes 7 and 8 and spacer frames A and B (or C and D) and in positions corresponding to the holes in the membranes and frames. In addition to holes 20, holes 21 are formed in the direction perpendicular to that of the holes 20 and joining with the holes 20. Through the holes 21 the concentrating solution and diluting solution are supplied or discharged. One stack is composed of many pairs of cation-permeable resin membranes and anion-permeable resin membranes (usually more than several tens). Between an anode and a cathode, one or several stacks and feeding frames are placed alternately. The number of pairs of membranes in a stack is limited due to difficulty of handling and the labor required for the assembling and disassembling. On the other hand the greater the number between a cathode and an anode, the lower the equipment cost and electric power cost. Therefore it is very advantageous to have many pairs of membranes in several stacks between a pair of electrodes as in the invention.

In FIGURE 1 only one stack is shown in detail and other stacks are shown by cross marks.

As shown in FIGURES 1 and 2, for each stack the solution may be supplied or discharged through the holes 21 of the feeding frames located on both sides of the stack, with the outer end of the holes 20 of the feeding frames closed, or alternately, when more than two stacks are jointly arranged, it is also possible to supply or discharge the solutions to the stacks from one common feeding frame through extended conduits formed by joining the hole 20 and closing the hole 21, so that the stacks make one big stack. Other various modes of the present apparatus will be discussed hereinafter. In FIGURE 1, a solution in concentrating cells 10 flows downwardly while a solution in diluting cells 9 flows upwardly, but the solutions may flow upwardly in concentrating cells and downwardly in diluting cells, or upwardly or downwardly in both cells.

The present apparatus may be constructed by placing membranes directly between the feeding frames 5 and by making the frame 5 to act also as fastening frame.

FIGURE 19 is a plan of one modification of frame B (or D) where in addition to the projections to projections 23 on sheet 32 of the solution path portions, there are provided projections 34 on a narrow strip of sheet 35 of the same material as the frame body and either integral with or joined to the frame body around the inside periphery thereof. There is also provided more grooves 33' and/or projections 33 around the whole periphery of the frame on the face thereof and outside of holes 25 and 28. These latter projections are also as thick as or thicker than the thickness of the frame body and compressible independently from the frame body. In the same way, grooves and/or projections are provided in the frame A (or C), but their positions are different from those of frame B (or D). These grooves and/or projections are effective to check the leakage of solution from the apparatus as a whole.

The projections 34 connected on the thin sheet 35 around the inner periphery of the frame can prevent the contact of two membranes when the area of the spacer 19 interposed between the membranes is smaller than the dialysis area so long as the edge of spacer is on the thin sheet 35.

In this invention the materials of the frame body 22 compressible projection 23, 33, thin sheet 32, 35, are selected from among elastic materials such as natural rubber, synthetic rubber, polythenes, polystyrol resin, polyester resins, urea and melamin resins, polyvinyl chloride resin, acrylic resins, polyamido resins, polyurethane resins. Natural rubber and synthetic rubbers are most suitable because of their low permanent deformation.

The joint line between solution path portion 26 and frame body 22 may be straight, or of any other shapes, and may be such that one end of the joint line ends at the edge of hole 28 of frame as shown in FIGURES 10–12. The projections 23 may have only one end on a sheet 32 thinner than frame body, as in FIGURES 9, 17, 18, or a projection can be on both sides of the sheet as in FIGURE 15, or the projection can extend between two spaced sheets.

As stated above, the diameter of hole 25 formed in the frame body 22 must be no smaller than that of hole 28 formed in solution path portion 26. If the former is smaller than the latter, when a stack is constructed to form a dialysis apparatus and then compressed, the edge of hole 25 is forced inside of hole 28 and the periphery of hole 28 is covered between two peripheries of holes 25, and this will cause a reduced flow in the cell compartment.

It is preferable to extend the solution path portion 26 inside the dialysis area as shown in FIG. 8. Thereby the flow rate of solution in the area just under hole 28 is reduced relative to the flow rate of solution coming along the inside edge 31 of the frame and more uniform flow is attained in the cell.

Referring to FIGURE 7 wherein one of manners of weaving of the spacer is shown, the direction of flow of the solution may be parallel to either warps 29 or wefts 36, or in an arbitrary direction in relation thereto. The warps and wefts may be of the same material and of the same diameter, of the same material and of different diameter, or of different material and the same diameter or different material and of different diameter. In constructing the stack, selectively ion-permeable resin membranes 7 and 8 and A- (or C-) or B- (or D-) frames may be assembled together as separate ones or as combined units formed by joining membranes and frames.

In the following example, an electrodialyzer according to this invention is used to concentrate sea water. 250 pairs of cation and anion selectively permeable resin membranes 7 and 8 each having an effective electrodialysing area of 100 dm.$^2$, 249 C-frames, 250 D-frames and 499 sheets of spacer 19, cut to the size of the electrodialysing area as shown in FIGURE 7, are assembled to form a stack consisting of 249 concentrating cells and 250 diluting cells having a distance between adjacent membranes of 0.75 mm. and then the stack is interposed between two feeding frames 5 and then the frames and the stack are inserted between a pair of electrodes as in FIGURE 1. A diluting solution of sea water is fed upward at a rate of 165 l./min. per 250 cells from the lower part of the dialysis apparatus, while a concentrating solution of concentrated sea water having a chloride ion concentration of 3.8 N is fed at a rate of 20 l./min. per 249 cells to concentrating cells 10. Electric current (D.C.) of 300 amp or current density of 3.0 amp/dm.$^2$ is applied. The desalted sea water having a chloride ion concentration of 0.26 N is discharged through conduits 14 located at the upper part of the apparatus, while a concentrated solution having a chloride ion concentration of 3.8 N is discharged for concentrating cells 10 through conduits 13 at a rate of 30 l./min. That is to say, 600 l./hr. of a concentrated solution of 3.8 N is obtained at a current efficiency of 85%. There is no trouble after continuous operation for 3 months.

The following example illustrates desalting of brackish water containing 6040 p.p.m. of dissolved substances to obtain drinking water having dissolved substances at a concentration of 390 p.p.m. Brackish water having a concentration of dissolved substances of 6040 p.p.m. is fed to diluting cells 9 of the first stack consisting of 260 pairs of membranes at a rate of 31.3 m.$^3$/hr. per 260 cells, and direct current of 220 amp or 2.20 amp/dm.$^2$ of current density is applied. There is obtained desalted water having dissolved substances at a concentration of 2400 p.p.m. and this water is fed to diluting cells 9 of the second stack consisting of 215 pairs of membranes, and direct current of 105 amp or 1.05 amp/dm.$^2$ of current density is applied to desalt the water to the extent of 960 p.p.m. The desalted water is then fed to diluting cells of the third stack consisting of 180 pairs of membranes and direct current of 60 amp or 0.5 amp/dm.$^2$ of current density is applied to finally obtain desalted water having dissolved substances at a concentration of 390 p.p.m. suitable for drinking at a rate of about 30 m.$^3$/hr. There is no trouble after continuous operation for three weeks at a current efficiency of 91%.

In the present invention cation selectively permeable resin membranes include ion exchange resin membranes having an ion exchange group of $-SO_3H$ and/or $-COOH$ and cation permeable amphoteric ion exchange resin membranes having an ion exchange group of $-SO_3H$ and/or $-COOH$ and $-NR_3$ (R is H or alkyl radical), and anion selectively permeable membranes include ion exchange resin membranes having an ion exchange group of $-NR_3$ (R is H or alkyl radical) and anion permeable amphoteric ion exchange resin membranes having an ion exchange group of $-NR_3$ (R is H or alkl radical) and $-SO_3H$ and/or $COOH$.

While this invention is described above in connection with specific apparatus, it is to be clearly understood that this description is made only by way of an example and not as a limitation to the scope of this invention as set forth in the appended claims.

What is claimed is:

1. An electrodialysis apparatus comprising a plurality of alternating anion-permeable resin membranes and cation-permeable resin membranes and spacer frames between each two membranes, each of said membranes and frames having a plurality of holes therein along the upper and lower parts thereof which are aligned with corresponding holes in the other membranes and frames for forming conduits for feeding and discharging concentrating and diluting solutions from the apparatus, alternate conduits being for the concentrating solution, and the other conduits being for the diluting solution, each frame having solution path portions therein from alternate holes to the inside of the frame, the solution path portions in each frame being associated with a hole in the frame which is aligned with a hole in the next adjacent frames on either side of the respective frame which have no solution path portions associated therewith, whereby of a plurality of holes forming a conduit only the aligned holes in alternate frames have flow path portions associated therewith, said flow path portions each having at least one thin sheet on the frame and having a thickness less than that of the frame and a plurality of compressible projections on said sheet extending in at least one direction from said sheet and having a dimension in the direction of the thickness of the frame such that in the uncompressed condition they project beyond the surface of the frame and they are compressed to the thickness of the frame when the frames and membranes are assembled, the projections being positioned on the sheet to provide only broken paths between the hole and the inside of the frame and said sheet and projections being of insulating material.

2. An electrodialysis apparatus as claimed in claim 1 in which the solution path portion completely surrounds the hole in the frame and opens into the entire periphery of the hole.

3. An electrodialysis apparatus as claimed in claim 1 in which the flow path portion is of the same material as the frame.

4. An electrodialysis apparatus as claimed in claim 3 in which the flow path portion is integral with the frame.

5. An electrodialysis apparatus as claimed in claim 3 in which the flow path portion is a separate piece and is joined to the frame.

6. An electrodialysis apparatus as claimed in claim 1 in which the flow path portion is of a different material than the frame and is joined thereto.

7. An electrodialysis apparatus as claimed in claim 1 in which said flow path portion extends past the inside periphery of the frame.

8. An electrodialysis apparatus as claimed in claim 1 in which said compressible projections extend in both directions from said thin sheet.

9. An electrodialysis apparatus as claimed in claim 1 in which said compressible projections extend in only one direction from said sheet.

10. An electrodialysis apparatus as claimed in claim 1 in which said flow path portion extends past the inside periphery of the frame, and further has a narrow strip of thin sheet having projections thereon around the inside periphery of the frame joining the inwardly projecting ends of said flow path portions.

References Cited by the Examiner

UNITED STATES PATENTS

| 2,799,644 | 7/57 | Kollsman | 204—301 |
| 2,881,124 | 4/59 | Tye | 204—301 |
| 2,894,894 | 7/59 | Kressman et al. | 204—301 |
| 2,981,671 | 4/61 | Griffiths | 204—301 |

FOREIGN PATENTS 212,532   2/58   Australia.

WINSTON A. DOUGLAS, *Primary Examiner.*

JOHN R. SPECK, MURRAY TILLMAN, JOHN H. MACK, *Examiners.*